United States Patent
Good

[11] 3,875,673
[45] Apr. 8, 1975

[54] SUPERCONDUCTIVE COIL WRAPPED WITH GLASS FIBER YARN

[76] Inventor: Jeremy Andrew Good, 72 Lexham Gardens, London, England

[22] Filed: Oct. 23, 1973

[21] Appl. No.: 408,289

[30] Foreign Application Priority Data
Oct. 23, 1972 United Kingdom............... 48829/72

[52] U.S. Cl............................. 335/216; 174/DIG. 6
[51] Int. Cl. .............................................. H01f 7/22
[58] Field of Search................. 335/216; 174/DIG. 6

[56] References Cited
UNITED STATES PATENTS

| | | |
|---|---|---|
| 3,363,207 | 1/1968 | Brechna............................ 335/216 |
| 3,466,581 | 9/1969 | Albrecht et al................. 335/216 X |
| 3,748,728 | 7/1973 | Watson........................... 174/DIG. 6 |
| 3,764,725 | 10/1973 | Kafka............................. 335/216 X |

Primary Examiner—G. Harris
Attorney, Agent, or Firm—Wood, Herron & Evans

[57] ABSTRACT

A superconductive coil comprising a winding of superconductive wire, at least one yarn of glass fibre wound helically around the wire, and epoxy resin impregnated into the assembly.

4 Claims, 3 Drawing Figures

SUPERCONDUCTIVE COIL WRAPPED WITH GLASS FIBER YARN

This invention relates to super conductive coil windings, i.e. windings of conductor material which in use below a determinable temperature (typically 4°K) exhibit the phenomenon of superconductivity. The windings may for example be for electro magnets, solenoids, field focussing coils, transformers and so on.

The super conducting coil is used to carry large currents, typically $10^5$ amp per sq. cm., in strong magnetic fields for example 10 tesla. The windings thus operate under very great stress. Movement of the conductors under stress results in energy dissipation and since specific heats are small at the low temperatures necessary to induce superconductivity, the resultant temperature rise may be sufficient to cause the superconducting properties of the conductor to be impaired. The conventional solution to the problems is to employ substantial quantities of high conductivity normal material in parallel with the superconductor to minimize such effects. Coils made by this method through they can reach the highest fields are cumbersome and expensive to produce an operate; in particular they are not suitable for generating intense field gradients such as quadrupole fields.

It has been proposed, as an alternative solution, to construct the winding so rigidly as to prevent the movement occurring. Simple potting in epoxy resin is too brittle to withstand the large stresses which result in fracture because the coefficient of expansion of the resulting coil is greater in the radial direction than around the circumference of the coil. Another proposal involves a glass fibre interleaving between successive layers of winding and potting in epoxy resin. However, coils constructed in this way fail by fracture along the layer. The insulation on the conductor is usually the cause of failure since it becomes brittle as the temperature is reduced.

A super conductive coil winding in accordance with the invention can however be sufficiently strong and rigid and comprises a winding of superconductive wire, the wire being wrapped in yarns of glass fibre, preferably having a diameter in the range 2-100 microns, wound helically round it, the whole being impregnated in epoxy resin. The wrapped wire may also be impregnated with a mixture of resin and solvent and baked under vacuum immediately after wrapping, to form a protective layer for the glass, before winding on the coil. The coil is preferably wound in layers interleaved with glass fibre for example in the form of a woven mat which may be unidirectional but may also be wound in such a way that the coils are synchronous or "autocyclic," that is to say with all the wires as closely packed together as possible, so that in cross-section the coil would reveal a regularly hexagonal array of wires. Since each wire of each layer would then be closely nested into the layer below the interleaving layer of glass fibres may be omitted and in this case thicker glass fibre yarn will be helically wound around the wires.

The arrangement is in any case, preferably such that the spaces between the wires are at least 30 and preferably 70%, filled with glass, the remainder of the space being filled, of course, with resin. The resultant mixture has a more uniform rate and reduced of expansion than the plan resin used in a conventionally-potted coil.

In addition to the glass fibre, an interlayer of conventional insulator such as PVA may be incorporated, particularly in the case of non-circular coils intended for special purposes, such as magnetic one separation.

A problem is met in the manufacture of such a coil in that common sizes, such as starch or flour size, which render the glass fibres sufficiently pliant and variable to wind round the conductor wire are incompatible with epoxy resins. It is undesirable to subsequently remove the size in the normal manner by heating and surface treatments for example epoxy silane treatment which are compatible with epoxy resin do not render the glass fibre sufficiently pliant and workable to be wound round the conductors.

The problem is overcome by a method in accordance with the invention comprising soaking glass fibre, having a surface threatment compatible with epoxy resin, in a distilled lubricant such as distilled white spirit and winding yarns of the fibre helically round a superconductive wire to form a sheath. The sheathed wire can then be wound into a coil, the coil impregnated in epoxy resin. Before the coil is impregnated with resin the spirit must be allowed to evaporate, for example in an oven, under vacuum either before or preferably after the sheathed wire is wound into a coil.

One embodiment of the invention will not be described by way of example with reference to the accompanying drawings in which:-

Figure 1:
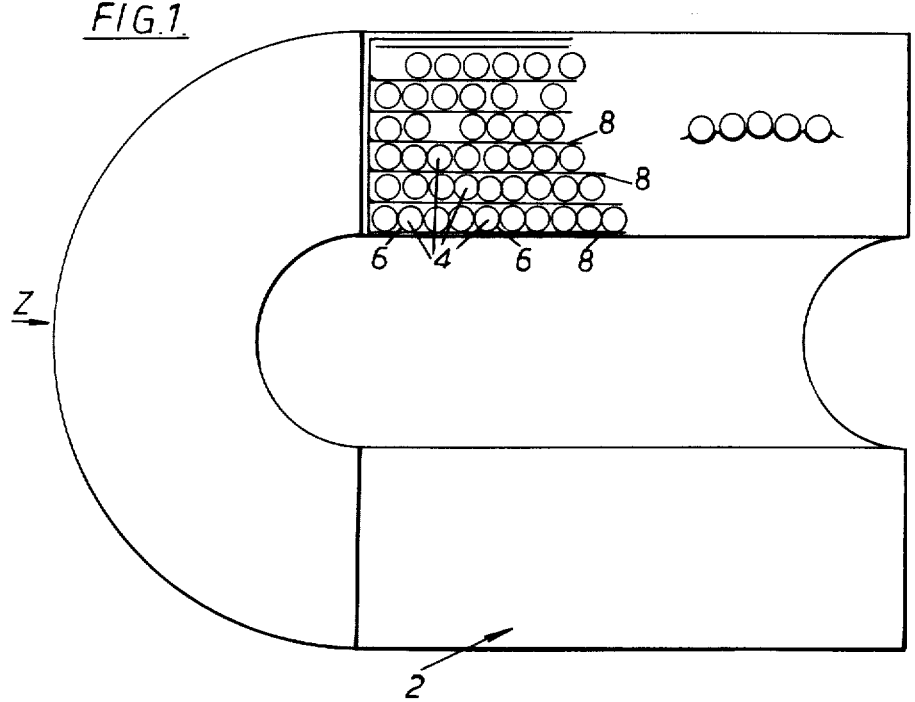
FIG. 1 is a perspective view through a coil in accordance with the invention which has been sectioned along its axis.
Figure 2:
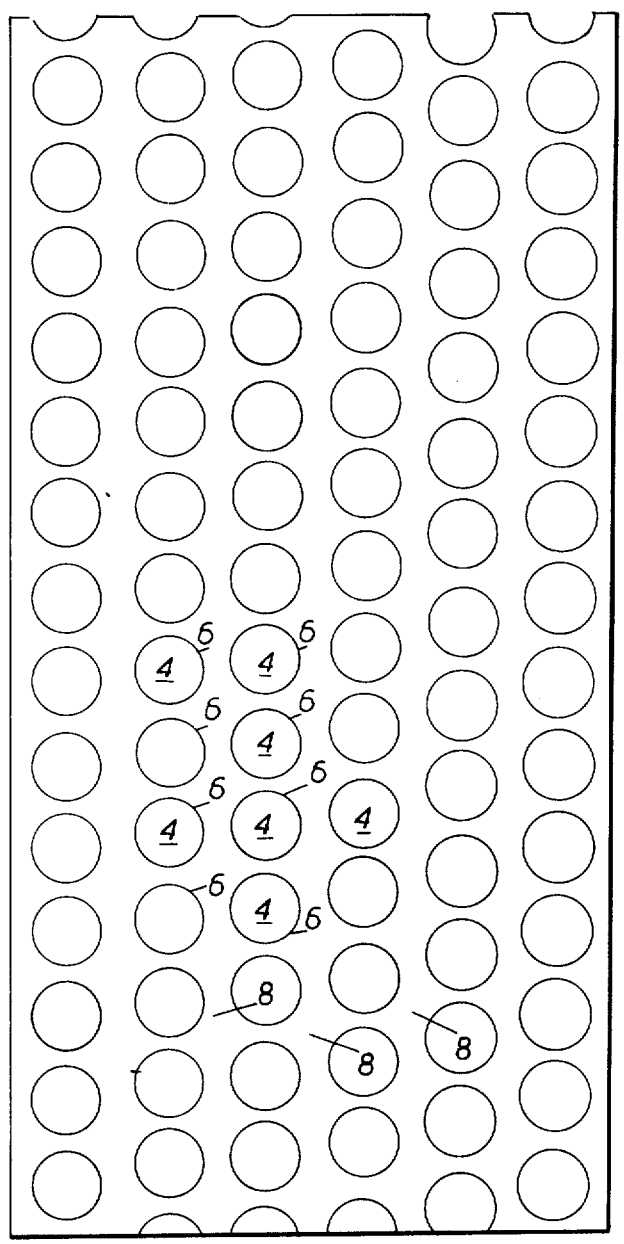
FIG. 2 is a detailed cross section of the coil.

The coil 2 in FIGS. 1 and 2 comprises coils 4 of wire of a material which super conducts at low temperatures e.g. 4°K. The wire is wrapped with a sheath 6 of helically wound yarns of glass fibre having a diameter in the range 2-100 microns. The winding is distributed in layers interleaved with layers 8 of woven glass fibre mat. The coil is filled with epoxy resin.

The coil can be made with a winding section greater than 4 cm. and yet withstand the tresses due to immersion in liquid nitrogen and the stressed involved in carrying high currents in high magnetic filed, because the spaces between the wires are filled with a mixture of resin and glass which gives the coil a more uniform expansion characteristic.

Figure 3:
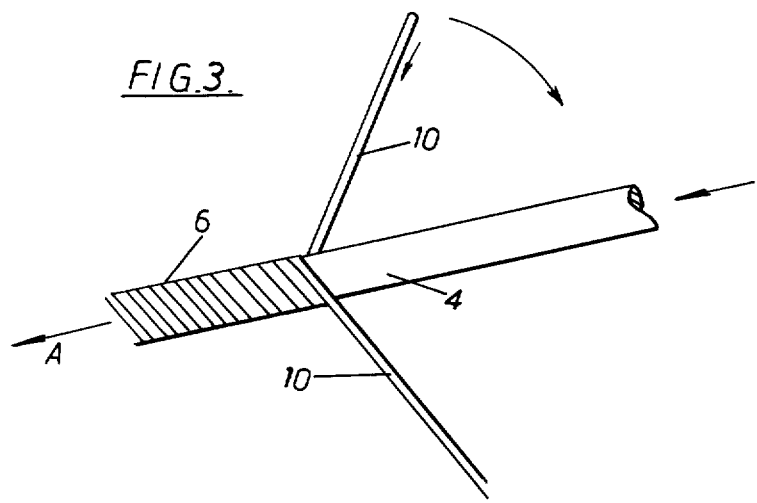
FIG. 3 is a sketch illustrating the method, in accordance with the invention, of winding glass fibre around the superconductive wire.

The glass fibre sheath 6 is formed from yarns of glass fibre which has been given a surface treatment compatible with epoxy resin. The surface treated fibre is lubricated with distilled lubricant such as distilled white spirit and pairs, for example, of yarns are wound round the wire by rotating the yarns 10 round the wire 4 as it is drawn past in the direction of arrow A in FIG. 3.

The distilled spirit is allowed to evaporate, e.g. in an oven under vacuum conditions often the sheathed wire is wound into a coil, interleaving the layers of winding with layers of woven glass fibre mat.

The coil is then vacuum impregnated in epoxy resin which is allowed to cure.

I claim:

1. In a superconductive coil fabricated of superconductive wire, the improvement in at least one winding layer of that coil comprising glass fiber yarn wrapped around said superconductive wire, said yarn being wrapped in helical fashion about said wire to provide a sheath for said wire, and epoxy resin impregnated into said winding layer to prevent movement of said yarn wrapped wire within said winding layer.

2. An improvement as set forth in claim 1, said wire being wrapped with multiple strands of yarn, and said yarn having fibers of a diameter between about 2 microns and about 100 microns.

3. An improvement as set forth in claim 1 in which said coil includes multiple layers of windings, said improvement further comprising a glass fiber mat interleaved between successive winding layers.

4. An improvement as set forth in claim 1 in which said coil includes multiple layers of windings, said winding layers being closely nested one with the other such that at least about 30% of the interstitial space between wires is filled with said glass yarn.

* * * * *